(12) United States Patent
Mori (10) Patent No.: US 10,948,065 B2
(45) Date of Patent: Mar. 16, 2021

(54) DIFFERENTIAL DEVICE

(71) Applicant: MUSASHI SEIMITSU INDUSTRY CO., LTD., Toyohashi (JP)

(72) Inventor: Hiroyuki Mori, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/498,072

(22) PCT Filed: Mar. 20, 2018

(86) PCT No.: PCT/JP2018/011140
§ 371 (c)(1),
(2) Date: Sep. 26, 2019

(87) PCT Pub. No.: WO2018/180805
PCT Pub. Date: Oct. 4, 2018

(65) Prior Publication Data
US 2020/0103013 A1    Apr. 2, 2020

(30) Foreign Application Priority Data
Mar. 30, 2017  (JP) .............................. JP2017-067253

(51) Int. Cl.
*F16H 37/08* (2006.01)
*F16H 48/40* (2012.01)
(Continued)

(52) U.S. Cl.
CPC ............. *F16H 48/38* (2013.01); *F16H 48/08* (2013.01)

(58) Field of Classification Search
CPC ......... F16H 48/38; F16H 37/082; F16H 48/40
See application file for complete search history.

(56) References Cited

U.S. PATENT DOCUMENTS 2,178,900 A * 11/1939 Starr ................... F16H 57/0483
184/11.1
2,466,683 A * 4/1949 Buckendale ............ F16H 48/11
475/205

(Continued)

FOREIGN PATENT DOCUMENTS

| JP | 2007-315439 A | 12/2007 |
| JP | 2014-098401 A | 5/2014 |
| JP | 2017-009109 A | 1/2017 |

*Primary Examiner* — Sherry L Estremsky
(74) *Attorney, Agent, or Firm* — Carrier Blackman & Associates, P.C.; Joseph P. Carrier; Anne G. Sabourin (57) ABSTRACT

A differential device includes a plurality of differential gears, one or a plurality of differential gear support members supporting the differential gears respectively, a support part supporting the differential gear support members, a pair of output gears meshing with each of the differential gears, a washer disposed on the output gears, one of cover members covering the back face side of the one of the output gears and has part of a planetary carrier and another cover member covering a back face side of the other output gear, one of the cover members formed on one of the output gears an abutment part that receives the washer, a plurality of through holes provided at intervals in a peripheral direction at positions where at least part thereof overlaps the abutment part, and a plurality of recess parts provided in parts where the through holes and the abutment part intersect.

6 Claims, 5 Drawing Sheets

(51) Int. Cl.
*F16H 48/38* (2012.01)
*F16H 48/08* (2006.01)

(56) References Cited

U.S. PATENT DOCUMENTS

| | | | | |
|---|---|---|---|---|
| 3,195,371 A * | 7/1965 | Christie | ............ | F16H 3/64 |
| | | | | 475/204 |
| 3,326,063 A * | 6/1967 | Mazziotti | ............ | F16H 48/22 |
| | | | | 475/234 |
| 3,413,873 A * | 12/1968 | Bixby | ............ | F16H 57/0483 |
| | | | | 475/160 |
| 3,974,717 A * | 8/1976 | Breed | ............ | F16H 48/08 |
| | | | | 475/86 |
| 4,095,675 A * | 6/1978 | Bell | ............ | F16H 3/64 |
| | | | | 184/6.12 |
| 4,162,637 A * | 7/1979 | Altmann | ............ | B60K 17/20 |
| | | | | 475/232 |
| 4,597,312 A * | 7/1986 | Hicks | ............ | F16H 3/64 |
| | | | | 29/401.1 |
| 5,520,589 A * | 5/1996 | Dewald | ............ | F16H 48/08 |
| | | | | 475/160 |
| 5,545,102 A | 8/1996 | Burgman et al. | | |
| 5,890,989 A * | 4/1999 | Yamazaki | ............ | B60K 23/08 |
| | | | | 180/247 |
| 6,932,734 B2 * | 8/2005 | Hwa | ............ | F16H 48/08 |
| | | | | 475/221 |
| 9,863,519 B2 | 1/2018 | Mori | | |
| 2005/0173180 A1 * | 8/2005 | Hypes | ............ | F16H 48/30 |
| | | | | 180/292 |

* cited by examiner

DIFFERENTIAL DEVICE

TECHNICAL FIELD

The present invention relates to a differential device mounted on a vehicle such as a four-wheeled automobile.

BACKGROUND ART

Conventionally, a technique involving a planetary carrier that exhibits the function of a differential case has been disclosed (for example Patent Document 1). Furthermore, a technique in which a washer and a differential case abut against each other has been conventionally disclosed (for example Patent Document 2).

RELATED ART DOCUMENTS

Patent Documents

Patent Document 1: Japanese Patent Application Laid-open No. 2014-098401
Patent Document 2: Japanese Patent Application Laid-open No. 2007-315439

SUMMARY OF THE INVENTION

Problems to be Solved by the Invention

However, in a combination of these techniques, if planetary pinion shaft holes are bored in a side washer portion of a differential device, stress is concentrated on a peripheral edge of the hole (an edge part, etc.), and there is a possibility that the abrasion resistance of a differential case that exhibits the function of a planetary carrier will be degraded.

The present invention has been accomplished in light of the above circumstances, and it is an object thereof to provide a differential device that enables the durability of a differential case (input member) to be improved.

Means for Solving the Problems

In order to attain the above object, a differential device according to the present invention comprises a plurality of differential gears, one or a plurality of differential gear support members supporting the plurality of differential gears respectively, a support part supporting the one or the plurality of differential gear support members, a pair of output gears meshing with each of the plurality of differential gears, a washer disposed on a back face side of at least one of the output gears, one cover member that can cover the back face side of the one of the output gears and has part of a planetary carrier or can be connected to at least part of the planetary carrier, and another cover member that can cover a back face side of the other output gear, the one cover member having formed on a face opposing the one of the output gears an abutment part that receives the washer, a plurality of through holes that are provided at intervals in a peripheral direction at positions where at least part thereof overlaps the abutment part, and a plurality of recess parts that are provided in parts where the through holes and the abutment part intersect.

Further, preferably, each of the recess parts has a width in a radial direction that is larger than a width in a radial direction of the washer.

Furthermore, preferably, each of the recess parts has a side face portion forming an outer periphery of the recess part, and all of the side face portions have a tapered shape or a rounded shape.

Moreover, preferably, the through hole includes a portion that is positioned further outside in a radial direction than a circle that is drawn concentrically with the output gear and defines an outer periphery of the abutment part, and the recess part has a bulge part that is positioned further outside in a radial direction than the circle and surrounds an edge of the through hole.

Further, the recess part extends up to an edge in a radial direction.

Effects of the Invention

In accordance with the present invention, the durability of a differential case (input member) can be improved.

EXPLANATION OF REFERENCE NUMERALS AND SYMBOLS

4 Carrier (planetary carrier)
4a Arm portion (carrier main body portion, portion of carrier, portion of planetary carrier)
11 Through hole (of first cover part)
11a Portion
15 Pinion gear (differential gear)
16 Pinion shaft (shaft, differential gear support member)
17 Case part (support part)
18 First cover member (one cover member, other cover member)
19 Second cover member (other cover member, one cover member)
33 Side washer (washer)
34 Abutment part
35 Recess part
35a First side face portion (side face portion)
35b Second side face portion (side face portion)
35c Third side face portion (side face portion)
37b Circle (defining outer periphery)
38 Bulge part
39 Recess part
39a First side face portion (side face portion)
39b Second side face portion (side face portion)
42 Side wall part
180 First cover member (one cover member, other cover member)
420 Side wall part
D Differential device
D1 Differential device
S Side gear (output gear)

MODES FOR CARRYING OUT THE INVENTION

One embodiment of the present invention is explained below by reference to the attached drawings.

First Embodiment

Figure 1:
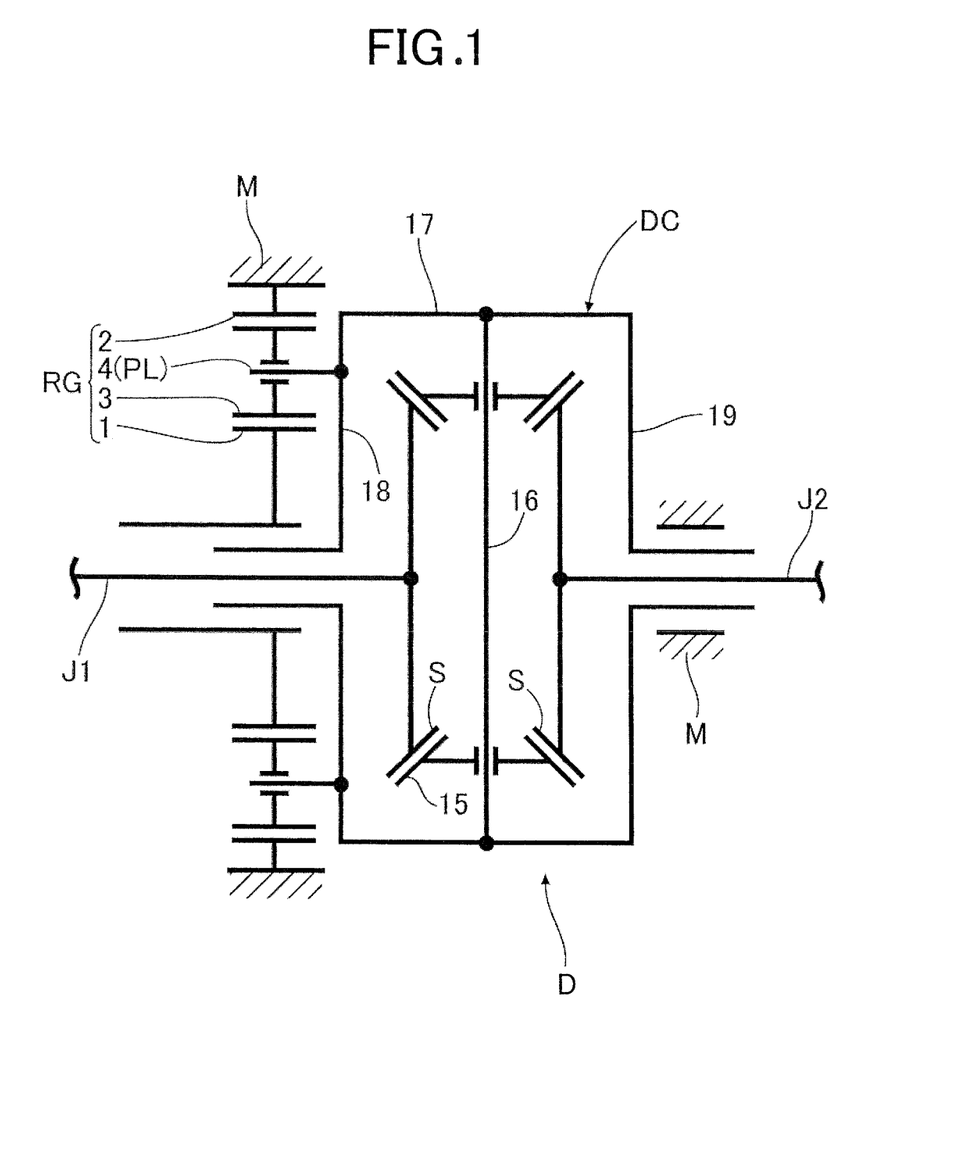
FIG. 1 is a skeleton diagram of a differential device and a reduction gear mechanism related to a first embodiment of the present invention. (first embodiment)

FIG. 1 schematically shows the overall arrangement of a differential device D related to one embodiment of the present invention. The differential device D is connected via a reduction gear mechanism RG to an engine (not illustrated) as a power source mounted on an automobile. The differential device D transmits rotational power transmitted from the engine to a differential case DC via the reduction gear mechanism RG and distributes it to output shafts J1 and J2 connected to a pair of axles, which are not illustrated, coaxially arranged in the vehicle width direction, thus driving the two axles while allowing differential rotation of the two axles. The differential device D is for example housed within a transmission case M disposed next to the engine in a vehicle body front part, together with the reduction gear mechanism RG in a state in which the reduction gear mechanism RG is adjacent thereto. In addition, for example, a conventionally known power connection/disconnection mechanism or forward/reverse travel switching mechanism (neither illustrated) is disposed between the engine and the reduction gear mechanism RG. A rotational axis L of the differential case DC coincides with the central axis of the output shafts J1 and J2.

In the present specification, 'axial direction' means a direction that is along the central axis of the output shafts J1 and J2 (that is, the rotational axis L of the differential case DC and a side gear S) or the axis of each gear of the reduction gear mechanism RG, and 'radial direction' means the radial direction of the differential case DC and the side gear S. 'Peripheral direction' means the peripheral direction of the differential case DC and the side gear S.

The reduction gear mechanism RG includes for example a sun gear 1 that is concentrically and rotatably fitted onto and supported on one end part of the differential case DC, a large diameter ring gear 2 that concentrically surrounds the sun gear 1 and is fixed to an inner wall of the transmission case M, a plurality of (for example four) planetary gears 3 that are disposed between the sun gear 1 and the ring gear 2 and mesh with the sun gear 1 and the ring gear 2, and a carrier 4 that axially supports the planetary gear 3. The sun gear 1 is for example linked to a crankshaft of the engine via a coupling mechanism, which is not illustrated, and power inputted into the sun gear 1 is transmitted to the differential case DC via the planetary gear 3 and the carrier 4 in sequence while being reduced in speed.

The carrier (planetary carrier) 4 has for example a carrier cover 4b formed into a ring shape, and a plurality of (for example four) arm portions (carrier main body portions) 4a that are provided at intervals in the peripheral direction of the carrier cover 4b around the rotational axis L and extend in the axial direction so that they can link the carrier cover 4b and a wall part (more specifically a side wall part 42 of a first cover member 18 described later) of the differential case DC. That is, each arm portion 4a forms part of the carrier 4. Each arm portion 4a is formed into for example a fan shape when viewed on a projection plane orthogonal to the rotational axis L of the differential case DC. In the present embodiment, the arm portion 4a is formed integrally with a wall part (more specifically the side wall part 42 of the first cover member 18 described later) of the differential case DC. That is, the arm portion 4a may be formed as part of the first cover member 18, which is described later.

The carrier cover 4b and at least one (all in the present embodiment) arm portion 4a are detachably joined by for example joining means (specifically a bolt 5 screwed into the arm portion 4a through the carrier cover 4b). The joining means is not limited to the bolt 5 and various types of joining means such as for example welding, clipping, or adhering may be selected.

The planetary gear 3 is disposed in for example a space between arm portions 4a that are adjacent to each other in the peripheral direction of the carrier 4. The planetary gear 3 extends rotatably through and is supported on a pivot shaft PL that passes through the space in parallel with the rotational axis L. One end part of the pivot shaft PL (the other end part of the pivot shaft PL) is for example fitted into and supported on a through hole 6 provided in the carrier 4 (more specifically the carrier cover 4b). A pin hole 7 extending in a direction transecting the through hole 6 is provided so as to straddle the carrier cover 4b and the other end part of the pivot shaft PL. A pin 8 is press fitted into the pin hole 7 of the carrier cover 4b, and the extremity of the pin 8 is engaged with the pivot shaft PL. This prevents the pivot shaft PL from falling out from the carrier cover 4b. When fixing the pin 8 to the carrier cover 4b, in addition to the press fitting, various types of joining means such as for example welding, swaging, adhering and screwing may be selected.

The other end part of the pivot shaft PL (one end part of the pivot shaft PL) is fitted into and supported on a through hole 11 provided as described later in a wall, opposing the carrier 4, of the differential case DC (more specifically, the side wall part 42 of the first cover member 18 described later). This allows the pivot shaft PL to be doubly supported by the carrier cover 4b of the carrier 4 and the differential case DC.

Figure 2:
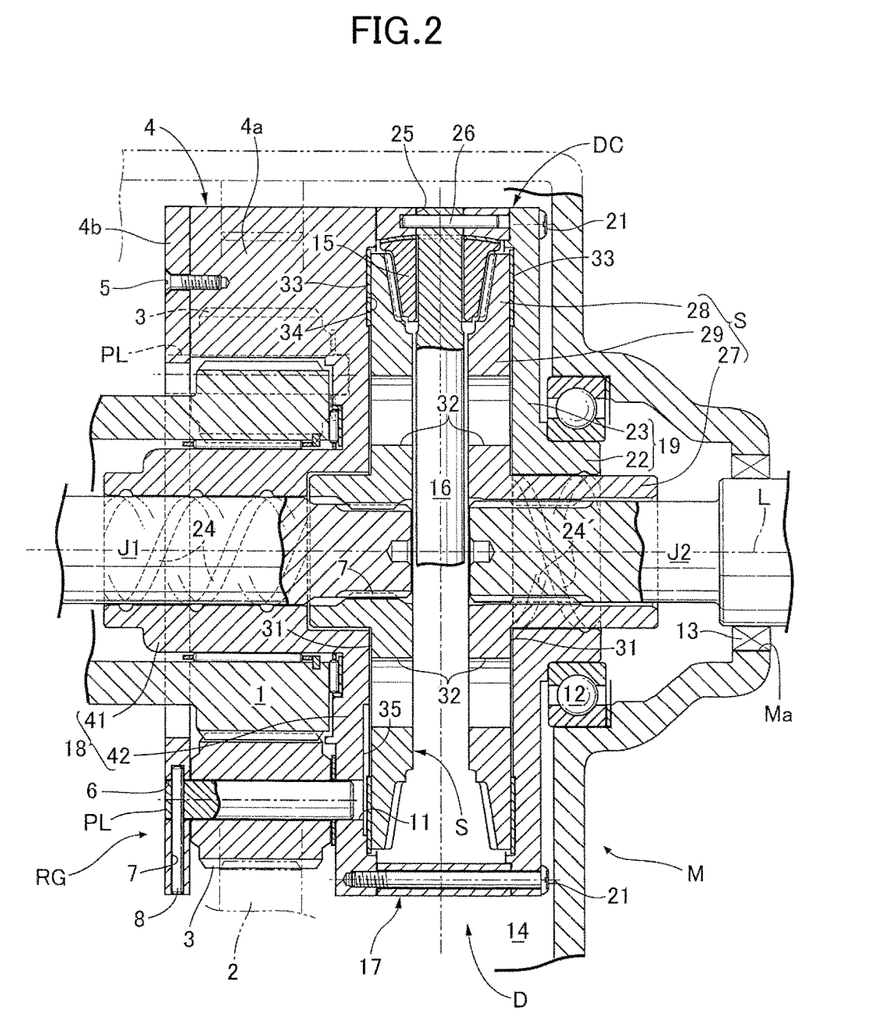
FIG. 2 is a vertical sectional view of an essential part of the differential device and the reduction gear mechanism related to the first embodiment of the present invention. (first embodiment)

One end part of the differential case DC (in the present embodiment, the right end part in the plane of the paper of FIG. 2) is for example rotatably supported on the transmission case M via a bearing member 12. On the other hand, on the other end part side of the differential case DC, although it is not illustrated, for example at least one of the sun gear 1, the carrier 4, and the output shaft J1 is rotatably supported on the transmission case M. This allows a joined body of the differential case DC and the carrier 4, which rotates as a unit, to be rotatably supported on the transmission case M.

A through hole Ma is formed in the transmission case M, the respective output shafts J1 and J2 for example being fitted into the through hole Ma. An annular seal member 13 is for example disposed between the inner periphery of the through hole Ma and the outer periphery of each of the output shafts J1 and J2, the seal member 13 providing a seal therebetween. An oil pan (not illustrated) is for example provided on a bottom part of the transmission case M, the oil pan facing an internal space 14 of the transmission case M and storing a predetermined amount of lubricating oil. Lubricating oil stored in the oil pan is agitated upward and scattered around due to rotation of a movable element of the reduction gear mechanism RG or the differential case DC in the internal space 14 of the transmission case M, thus enabling mechanical moving parts present in the interior and exterior of the differential case DC to be lubricated. Alternatively, lubricating oil stored in the oil pan may be suctioned by means of an oil pump (not illustrated) and forcibly sprayed or scattered toward a specific site of the internal space 14 of the transmission case M, for example, the reduction gear mechanism RG, the differential case DC, or an inner wall of the transmission case M around the differential case DC.

The differential device D includes for example the differential case DC, a plurality of pinion gears 15 housed within the differential case DC, a pinion shaft 16 housed within the differential case DC and rotatably supporting the pinion gear 15, and a pair of the side gears S housed within the differential case DC, meshing with the pinion gear 15 from left and right sides, and connected to the pair of output shafts J1 and J2 respectively. The side gear S is one example of an output gear, the pinion gear 15 is one example of a differential gear, the pinion shaft 16 is one example of a differential gear support member, and the differential case DC is one example of an input member.

The pinion gear 15 is for example housed in and supported on the differential case DC, and can spin around an axis in the radial direction with respect to the differential case DC and can revolve around the center of rotation of the differential case DC accompanying rotation of the differential case DC.

The pinion shaft 16 is for example disposed within the differential case DC so as to be orthogonal to the rotational axis L of the differential case DC. The pinion shaft 16 is for example supported on a pair of support holes 25 extending on one diameter through a tubular case part 17, which is described later. The pinion shaft 16 is supported on the below-mentioned case part 17 with a pin 26 inserted into the below-mentioned case part 17 so as to extend through one end part of the pinion shaft 16 and prevent it from falling out. The pin 26 is for example prevented from falling out from the below-mentioned case part 17 by making one end of the pin 26 abut against a first cover part 18 bolted to the below-mentioned case part 17.

In the present embodiment, an arrangement in which the pinion shaft 16 is formed into a straight rod shape and two of the pinion gears 15 are supported on opposite end parts of the pinion shaft 16 respectively is illustrated, but the present invention is not limited thereto. In the present invention, for example, three or more pinion gears 15 may be provided. In this case, the pinion shaft 16 is formed into an intersecting rod shape in which three or more branches corresponding to the three or more pinion gears 15 extend radially from the rotational axis L of the differential case DC (for example, when there are four pinion gears 15 it is a cross shape), and each of the pinion gears 15 is supported on the respective extremity of the pinion shaft 16.

In addition, a plurality (more specifically, the same number as that of the plurality of pinion gears 15) of pinion shafts 16 may be prepared and each supported on the differential case DC, and the plurality of pinion gears 15 may be individually supported by the plurality of pinion shafts 16 each supported on the differential case DC. That is, the plurality of pinion gears 15 may be rotatably supported using a plurality of pinion shafts 16 and a support member (support part) that has a plurality of surrounding walls disposed at equal intervals around the rotational axis L of the differential case DC and each surrounding one pinion gear 15 while supporting opposite end parts of one pinion shaft 16 and that has a plurality of linking plates (linking parts) that link (connect) two adjacent surrounding walls.

The pinion gear 15 may be directly fitted on the pinion shaft 16 or may be fitted via bearing means such as a bearing bush. The pinion shaft 16 may have a shaft shape having a substantially uniform diameter along its entire length or may have a stepped shaft shape.

The pinion gear 15 and the side gear S are formed from for example a bevel gear. With regard to the pinion gear 15 and the side gear S, for example, the entirety including a tooth part of the pinion gear 15 and the side gear S is formed by plastic processing such as forging. Because of this, there are no restrictions in terms of machining, unlike a case in which the tooth parts of the pinion gear 15 and the side gear S are subjected to machining, and the tooth part can be formed with any gear ratio at high precision. With regard to the pinion gear 15 and the side gear S, instead of a bevel gear another gear may be employed and, for example, the side gear S may be a face gear and the pinion gear 15 may be a spur gear or a helical gear.

The pair of side gears S include for example a cylindrical shaft part 27 into which axially inner end parts of the pair of output shafts J1 and J2 are fitted by a spline fitting 7, an annular tooth part 28 that is present at a position spaced from the shaft part 27 outward in the radial direction and has a tooth face meshing with the pinion gear 15, and an intermediate wall part 29 that is formed into a flat ring-plate shape extending radially outward from an axially inner end part of the shaft part 27 toward an end part on the inner periphery of the tooth part 28. With regard to the pair of side gears S, the shaft part 27 and the end part on the inner periphery of the tooth part 28 are connected integrally by means of the intermediate wall part 29.

The shaft part 27 of each side gear S is for example rotatably fitted directly into a boss part 22 of respective cover members 18 and 19, which are described later, but may be fitted via a bearing.

Formed in the intermediate wall part 29 of at least one (both in the present embodiment) of the left and right side gears S at intervals in the peripheral direction are for example a plurality of oil passages 32 extending so as to transect the intermediate wall part 29 in the axial direction. Therefore, lubricating oil flows smoothly within the differential case DC between the axially inner side and the axially outer side of the side gear S through the oil passage 32. Although not illustrated, a plurality of through holes allowing lubricating oil to flow between the interior and the exterior of the differential case DC may be provided, at intervals in the peripheral direction, in a side wall part 23 of at least one of the cover members 18 and 19, which are described later.

The differential case DC has for example the short cylindrical (tubular) case part (support part) 17, which supports the pinion shaft 16 so that it can rotate together with the pinion shaft 16, the first cover member 18, which can cover a back face side of one (one side gear S) of the pair of side gears S and rotates integrally with the case part 17, and the second cover member 19, which can cover a back face side of the other (the other side gear S) of the pair of side gears S and can rotate integrally with the case part 17.

The first cover member (one cover member, other cover member) 18 has for example a cylindrical boss part 41 that concentrically surrounds the shaft part 27 of the side gear S and is rotatably fitted onto and supports it, and the plate-shaped and ring-shaped side wall part 42, which is formed integrally with an axially inner end part of the boss part 41 with the entirety or the majority of an outside face as a flat face orthogonal to the rotational axis L of the differential case DC. In the present embodiment, the arm portion 4a of the carrier 4 is formed integrally with the side wall part 42 of the first cover member 18. That is, the first cover member 18 of the present embodiment may have part of the carrier 4 (more specifically, the arm portion 4a of the carrier 4) in addition to the boss part 41 and the side wall part 42.

The first cover member 18 is for example detachably joined to the second cover member 19 and the case part 17 by joining means such as a bolt 21. As the joining means, appropriate joining means, other than the bolt 21, such as for example swaging, adhering, or welding may be employed.

Figure 3:
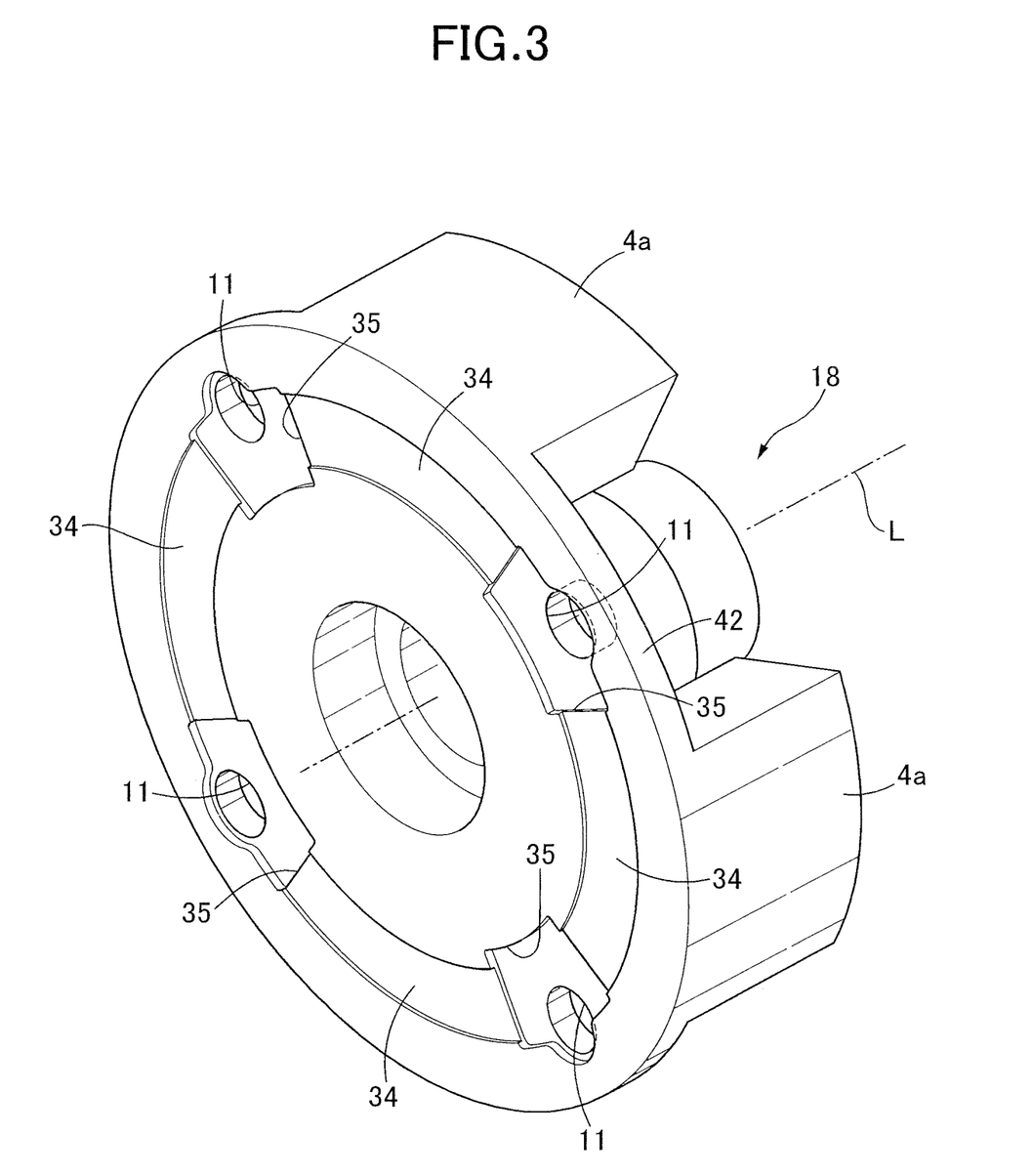
FIG. 3 is a perspective view of a first cover member. (first embodiment)

As shown in FIG. 3, the side wall part 42 has for example an abutment part 34 that is provided on an axially inner face of the side wall part 42 (face opposing the side gear S) with an annular shape having any width in the radial direction and receives an annular side washer 33 disposed on the rear side of the side gear S, a plurality of through holes 11, which are provided at intervals in the peripheral direction at positions where at least part overlaps the abutment part 34, extend in the axial direction, and each support the other end part of the plurality of pivot shafts PL (one end part of the pivot shaft PL), and a plurality of recess parts 35 that are provided in parts where the through holes 11 and the abutment parts 34 intersect and are indented further than the abutment part 34 so as to go away from the opposing side gear S.

Figure 4:
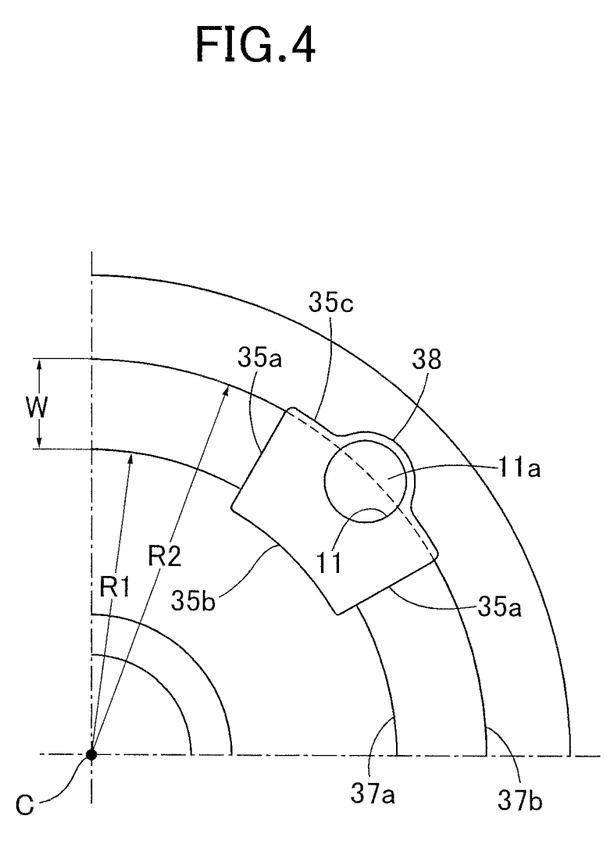
FIG. 4 is a partial front view of the first cover member. (first embodiment)

The abutment part 34 is for example formed into a smooth face that extends within a virtual plane orthogonal to the rotational axis L. As shown in FIG. 4, the smooth face is for example partitioned into a circle 37a having a center C on the rotational axis L and a first diameter R1 and a circle 37b having a center C on the rotational axis L and a second diameter R2 that is larger than the first diameter RE The difference between the first diameter R1 and the second diameter R2 corresponds to a width W in the radial direction of the abutment part 34.

As shown in FIG. 4, each through hole 11 includes for example a portion 11a that is positioned further outside in the radial direction than the circle 37b, which is drawn concentrically with the side gear S and defines the outer periphery of the abutment part 34. That is, part of each through hole 11 overlaps the abutment part 34. Each through hole 11 is formed from a cylindrical space having a central axis parallel to the rotational axis L.

As shown in FIG. 4, each recess part 35 has for example a pair of first side face portions (peripheral edge along outline of recess part 35) 35a extending in the radial direction, a second side face portion 35b that connects one end (radially inner end) of each of the first side face portions 35a along a circle drawn concentrically with the side gear S, and a third side face portion 35c that connects the other ends (radially outer ends) of the first side face portions 35a along a circle drawn concentrically with the side gear S. That is, the outer periphery of each recess part 35 is formed from the first side face portions 35a, the second side face portion 35b, and the third side face portion 35c.

The first side face portion 35a, the second side face portion 35b, and the third side face portion 35c all form for example a tapered shape or a rounded shape. The second side face portion 35b of the recess part 35 is displaced further toward the center C side (inside in the radial direction) than the first diameter R1 of the abutment part 34 (the circle 37a with the first diameter R1). The third side face portion 35c of the recess part 35 is displaced further outward in the radial direction than the second diameter R2 of the abutment part 34 (the circle 37b with the second diameter R2). That is, the recess part 35 has a width (dimension) in the radial direction that is larger than the width (dimension) of the side washer 33.

The third side face portion 35c of the recess part 35 has for example a bulge part 38 that is positioned further outside in the radial direction than the circle 37b and surrounds the edge of the through hole 11. The bulge part 38 describes for example an arc that is concentric with the through hole 11.

An outer peripheral face of the output shaft J1 is relatively rotatably fitted directly into an inner peripheral face of the boss part 41 of the first cover member 18. A helical channel 24 that can forcibly feed lubricating oil from the axially outer end of the boss part 41 toward the axially inner side accompanying relative rotation between the first cover member 18 and the output shaft J1 is formed in an inner peripheral face of the boss part 41.

The second cover member (other cover member, one cover member) 19 has for example the cylindrical boss part 22, which rotatably fits onto and supports the shaft part 27 of the side gear S while concentrically surrounding it, and the plate-shaped and ring-shaped side wall part 23, which is formed integrally with an axially inner end part of the boss part 22 with the entirety or the majority of an outside face as a flat face orthogonal to the rotational axis L of the differential case DC. An end part of the outer periphery of the side wall part 23 of the second cover member 19 is for example formed integrally with the case part 17.

An axially inner face of the side wall part 23 of the second cover member 19, that is, a face opposing a back face 31 of the side gear S, rotatably supports the back face part of the tooth part 28 of the side gear S via the side washer 33. The side washer 33 is for example fitted into and supported on the annular abutment part 34 formed on at least one of mutually opposing faces of the axially inner face of the side wall part 23 of the second cover member 19 and the back face part of the tooth part 28 of the side gear S (in the present embodiment the axially inner face of the side wall part 23 of the second cover member 19).

An outer peripheral face of the output shaft J2 is relatively rotatably fitted directly into an inner peripheral face of the boss part 22 of the second cover member 19. A helical channel 24' that can forcibly feed lubricating oil from the axially outer end of the boss part 22 toward the axially inner side accompanying relative rotation between the second cover member 19 and the output shaft J2 is formed in the inner peripheral face of the boss part 22.

The operation of the present embodiment is now explained. With regard to the differential device D of the present embodiment, if the differential case DC receives rotational power from the engine via the reduction gear mechanism RG, when the pinion gear 15 does not spin around the pinion shaft 16 but revolves around the rotational axis L of the differential case DC together with the differential case DC, the left and right side gears S are rotated by the differential case DC at the same speed via the pinion gear 15, and the driving force of the side gear S is transmitted equally to the left and right output shafts J1 and J2. When a difference in rotational speed occurs between the left and right output shafts J1 and J2 due to turning of the automobile, the pinion gear 15 revolves around the rotational axis L of the differential case DC while spinning, thus transmitting the rotational force from the pinion gear 15 to the left and right side gears S while allowing differential rotation. The above operation is the same as in a conventionally known differential device.

In accordance with the present embodiment, the first cover member 18 has formed in the face opposing the side gear S of the side wall part 42 the plurality of through holes 11 extending in the axial direction and the abutment part 34 receiving one of the side washers 33. Further formed in the side wall part 42 of the first cover member 18 in the parts where the through holes 11 and the abutment parts 34 intersect are the plurality of recess parts 35, which are indented (recessed) more than the abutment part 34. The first cover member 18 can thus avoid a concentration of stress on the peripheral side (edge part, etc.) of the opening of the through hole 11. The durability of the first cover member 18 (differential case DC) can therefore be improved. Consequently, the overall durability of the differential device D can be improved.

In accordance with the present embodiment, since the first cover member 18 has the recess part 35 that is larger in the radial direction than the abutment part 34, which abuts against the side washer 33, it is easy for lubricating oil to build up. The durability of the first cover member 18 (differential case DC) can thus be improved due to the increase in the amount of lubricating oil. Consequently, the overall durability of the differential device D can be improved.

Furthermore, in accordance with the present embodiment, with regard to the first cover member 18, all of the side face portions 35a, 35b, and 35c forming the recess part 35 have a tapered shape or a rounded shape. This eliminates the necessity for a deburring step for the axially inner face of the side wall part 42 of the first cover member 18. Because of this, the production process can be simplified, and the production cost can be suppressed.

In accordance with the present embodiment, the through hole 11 includes the portion 11a positioned further outside in the radial direction than the circle 37b, which is drawn concentrically with the side gear S and defines the outer periphery of the abutment part 34, and the recess part 35 has the bulge part 38 positioned further outside in the radial direction than the circle 37b and surrounding the edge of the through hole 11. This enables lubricating oil that has lubricated the side washer 33 to be guided to the through hole 11 by virtue of the action of the bulge part 38 even if the through hole 11 is positioned further outside in the radial direction than the outer periphery of the abutment part 34. As a result, the amount of lubricating oil flowing in between the through hole 11 and the planetary gear 3 can be increased. The overall durability of the device including the reduction gear mechanism RG and the differential device D can therefore be improved.

Second Embodiment

Figure 5:
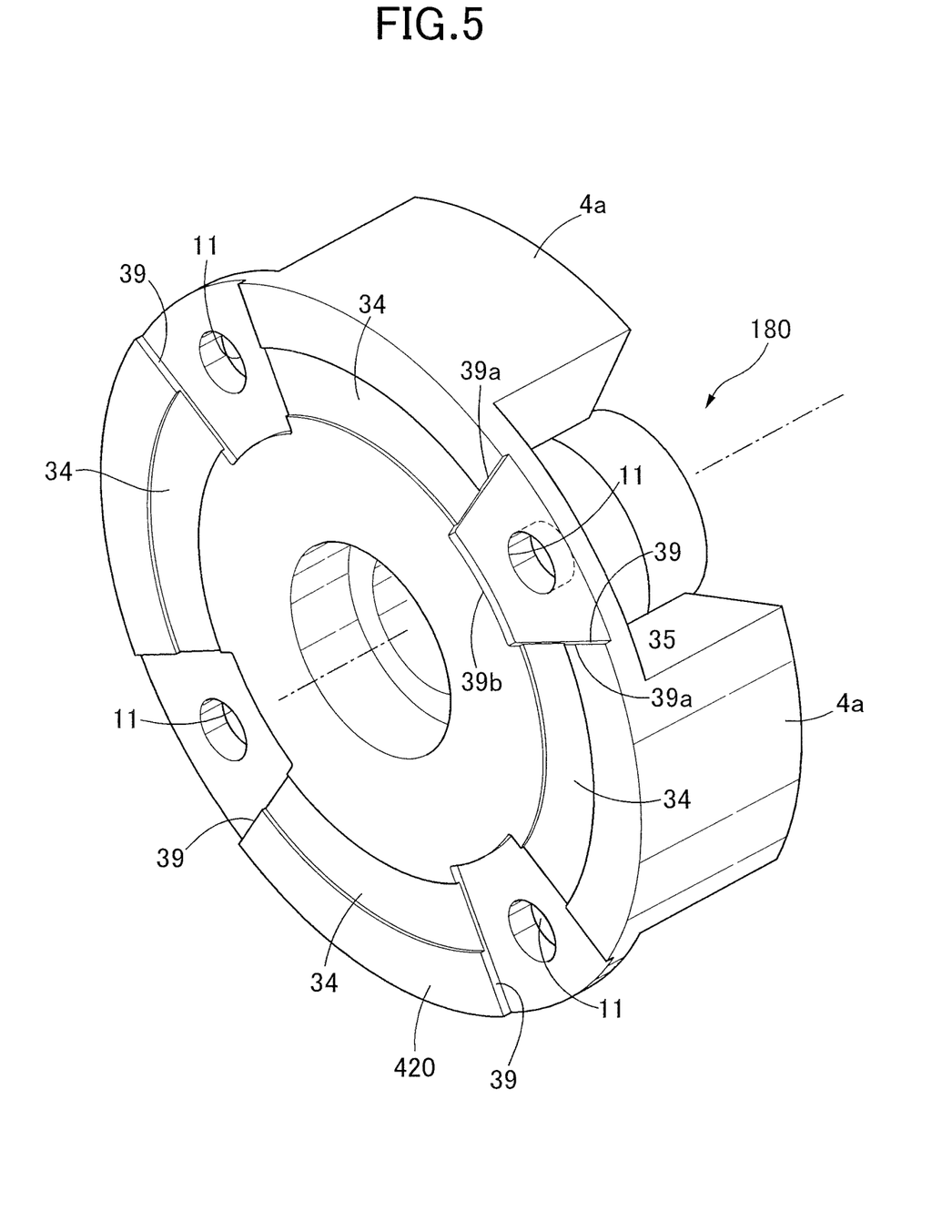
FIG. 5 is a perspective view of a first cover member related to a second embodiment of the present invention. (second embodiment)

FIG. 5 schematically shows a first cover member 180 of a differential device D1 related to a second embodiment of the present invention. Other than the first cover member 180 the arrangement is the same as that of the differential device D related to the first embodiment. Because of this, in the second embodiment differences from the first embodiment are explained, but the parts that are the same as those of the first embodiment are denoted by the same reference numerals and symbols and a detailed explanation thereof is omitted.

In the differential device D1 related to the second embodiment, the first cover member (one cover member, other cover member) 180 has for example the cylindrical boss part 41 rotatably fitted onto and supporting the shaft part 27 of the side gear S while concentrically surrounding it, and a plate-shaped and ring-shaped side wall part 420 that is formed integrally with an axially inner end part of the boss part 41 with the entirety or the majority of an outside face as a flat face orthogonal to a rotational axis L of a differential case DC1. In the second embodiment also, the arm portion 4a of the carrier 4 is formed integrally with the side wall part 420 of the first cover member 180. That is, the first cover member 180 of the second embodiment may also have, in addition to the boss part 41 and the side wall part 420, part of the carrier 4 (more specifically, the arm portion 4a of the carrier 4). The arm portion 4a of the carrier 4 forms part of the carrier 4 in the same manner as in the first embodiment.

The side wall part 420 of the first cover member 180 has the abutment part 34 provided at arbitrary intervals in the peripheral direction around the rotational axis L on the radially inner face (face opposing the side gear S) and receiving the annular side washer 33 disposed on the rear side of the side gear S, the plurality of through holes 11 provided at intervals in the peripheral direction, extending in the axial direction, and each supporting the other end parts of the plurality of pivot shafts PL (one end part of pivot shaft PL), and the plurality of recess parts 39 formed in the parts where the through holes 11 and the abutment parts 34 intersect and indented further than the abutment part 34 so as to go away from the opposing side gear S. The through hole 11 is formed from for example a cylindrical space having a central axis parallel to the rotational axis L. The abutment part 34 is for example formed into a smooth face that extends within a virtual plane orthogonal to the rotational axis L.

The recess part 39 has a pair of first side face portions (peripheral edge along outline of recess part 39) 39a extending in the radial direction, and a second side face portion 39b that connects one end (radially inner end) of each of the first side face portions 39a along a circle drawn concentrically with the side gear S. The first side face portion 39a extends up to the edge on the outer peripheral side of the first cover member 180. That is, the other end (radially outer end) of each of the first side face portions 39a reaches the edge on the outer peripheral side of the first cover member 180. That is, the recess part 39 opens in the radial direction via the edge on the outer peripheral side of the first cover member 180 (end part in radial direction). The first side face portion (side face portion) 39a and the second side face portion (side face portion) 39b all have for example a tapered shape or a rounded shape. The second side face portion 39b of the recess part 39 is for example disposed further on the center C side (inward in the radial direction) than the first diameter R1 of the abutment part 34 (the circle 37a with the first diameter R1). Therefore, in accordance with the second embodiment, the same effects as those of the first embodiment can be obtained.

Embodiments of the present invention are explained above, but the present invention is not limited to the above embodiments and may be modified in a variety of ways as long as the modifications do not depart from the subject matter thereof.

In the first embodiment and the second embodiment, four pinion gears are used, but the present invention is not limited thereto. The present invention may be applied not only to a case where the number of pinion gears is four but also to a case where it is two, three, five, or more.

In the first embodiment and the second embodiment, the first cover member and the arm portion of the carrier are formed as a unit, but the present invention is not limited thereto. In the present invention, the first cover member and the arm portion of the carrier may be formed as separate bodies and the first cover member and the arm portion of the carrier may be linked (connected). Furthermore, in the present invention the first cover member and the carrier may be formed as separate bodies and the first cover member and the carrier may be linked (connected).

The invention claimed is:

1. A differential device comprising
a plurality of differential gears,
one or a plurality of differential gear support members supporting the plurality of differential gears respectively,
a support part supporting said one or the plurality of differential gear support members,
a pair of output gears meshing with each of the plurality of differential gears, a washer disposed on a back face side of at least one of the output gears, one cover member that can cover the back face side of said one of the output gears and has part of a planetary carrier or can be connected to at least part of the planetary carrier, and another cover member that can cover a back face side of the other output gear, the one cover member having formed on a face opposing said one of the output gears an abutment part that receives the washer, a plurality of through holes that are provided at intervals in a peripheral direction at positions where at least part thereof overlaps the abutment part, and a plurality of recess parts that are provided in parts where the through holes and the abutment part intersect, wherein each of the recess parts has a width in a radial direction that is larger than a width in the radial direction of the washer.

2. The differential device according to claim 1, wherein each of the recess parts has a side face portion forming an outer periphery of each of the recess parts, and all of the side face portions have a tapered shape or a rounded shape.

3. The differential device according to claim 2, wherein each of the through holes includes a portion that is positioned further outside in a radial direction than a circle that is drawn concentrically with the output gear and defines an outer periphery of the abutment part, and each of the recess parts has a bulge part that is positioned further outside in a radial direction than the circle and surrounds an edge of each of the through holes.

4. The differential device according to claim 2, wherein each of the recess parts extends up to an edge in a radial direction.

5. The differential device according to claim 1, wherein each of the through holes includes a portion that is positioned further outside in a radial direction than a circle that is drawn concentrically with the output gear and defines an outer periphery of the abutment part, and each of the recess parts has a bulge part that is positioned further outside in a radial direction than the circle and surrounds an edge of the through hole.

6. The differential device according to claim 1, wherein each of the recess parts extends up to an edge in a radial direction.

* * * * *